US012627246B1

(12) United States Patent
Qi et al.

(10) Patent No.: US 12,627,246 B1
(45) Date of Patent: May 12, 2026

(54) ELECTRICALLY DRIVEN DISTILLATION SYSTEM WITH VARIABLE DYNAMIC LOAD AND A DISTILLATION METHOD

(71) Applicant: China University of Petroleum (East China), Qingdao (CN)

(72) Inventors: Meng Qi, Qingdao (CN); Chengtian Cui, Qingdao (CN); Xiaodong Zhang, Qingdao (CN); Dongfeng Zhao, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 6 days.

(21) Appl. No.: 19/028,181

(22) Filed: Jan. 17, 2025

(51) Int. Cl.
*H02P 9/02* (2006.01)
*G05B 13/02* (2006.01)
*H02P 27/06* (2006.01)

(52) U.S. Cl.
CPC ............ *H02P 9/02* (2013.01); *G05B 13/0275* (2013.01); *H02P 27/06* (2013.01)

(58) Field of Classification Search
None
See application file for complete search history.

(56) References Cited

U.S. PATENT DOCUMENTS 9,450,513 B2 * 9/2016 Ohori ........................ H02J 3/48
11,916,397 B2 * 2/2024 Nakakita ................... H02J 3/32
(Continued)

FOREIGN PATENT DOCUMENTS

CN 107465189 A * 12/2017 ............... H02J 3/01
CN 108462209 A * 8/2018 ............. H02J 3/381
(Continued)

OTHER PUBLICATIONS

Torres et al., "Virtual Synchronous Generator: A Control Strategy to Improve Dynamic Frequency Control in Autonomous Power Systems", Energy and Power Engineering, Apr. 2013, 5, 32-38. (Year: 2013).*
Zhao et al., "A Novel Droop Control of Grid Converter to Enhance Small Signal Stability of Fractional Frequency Wind Power System", 2023, 2023 IEEE 2nd International Power Electronics and Application Symposium. (Year: 2023).*
(Continued)

*Primary Examiner* — Mohammad Ali
*Assistant Examiner* — Kelvin Booker

(57) ABSTRACT

The present invention provides an inverter control method, device, computer equipment and storage medium, belonging to the field of power electronics. The method comprises: determining a frequency control equation of the inverter under a grid-connected condition when the inverter is in a VSG control mode; determining a relationship between a virtual electromotive force of a virtual synchronous generator in a reactive state and an output voltage of the inverter; constructing a voltage-current double closed-loop control structure of the inverter under the VSG control mode, and determining a current reference value and a voltage reference value of the virtual synchronous generator under $d_q$ axes through the frequency control equation and the relationship; constructing a fuzzy control rule of a virtual damping coefficient and a virtual inertia according to the current reference value and the voltage reference value; and controlling the virtual damping coefficient and the virtual inertia through the fuzzy control rule, thereby improving the stability and performance of the inverter during the grid-connected process, reducing the harmonic disturbance of the power system, and helping to improve the adaptability and reliability of the entire photovoltaic power generation system.

9 Claims, 3 Drawing Sheets

PV = Photovoltaic
SC = Supercapacitor
IPC = Instantaneous Power Calculation
Active Power = Active Power Frequency Control Link
Reactive Power = Reactive Power Frequency Control Link
VIC = Virtual Impedance Control
Control Loop = Current Inner Control Loop

(56) References Cited

U.S. PATENT DOCUMENTS

| | | | | |
|---|---|---|---|---|
| 12,525,804 | B2 * | 1/2026 | Weiss .................... | H02J 3/0014 |
| 2017/0187188 | A1 * | 6/2017 | Aubert Guyon ........ | H02J 3/381 |
| 2017/0235322 | A1 * | 8/2017 | Rahmani ................... | G05F 1/66 |
| | | | | 700/295 |
| 2018/0145582 | A1 * | 5/2018 | Shuai ...................... | H02M 1/32 |
| 2019/0109461 | A1 * | 4/2019 | Khajehoddin ............ | H02J 3/42 |
| 2020/0212823 | A1 * | 7/2020 | Gong .................... | H02J 3/0014 |
| 2020/0335978 | A1 * | 10/2020 | Ren ........................ | H02J 3/0014 |
| 2022/0190681 | A1 * | 6/2022 | Shine ........................ | H02J 3/28 |
| 2022/0205424 | A1 * | 6/2022 | Liu ........................ | F03D 7/0272 |
| 2022/0320865 | A1 * | 10/2022 | Zhang ................... | H02J 3/0014 |
| 2023/0283083 | A1 * | 9/2023 | Manjrekar ................ | H02J 3/18 |
| | | | | 307/82 |
| 2025/0096578 | A1 * | 3/2025 | Manjrekar ................ | H02J 3/18 |

FOREIGN PATENT DOCUMENTS

| | | | | | |
|---|---|---|---|---|---|
| CN | 108390396 | B | * | 8/2019 | ........... H02J 3/0014 |
| CN | 106655275 | B | * | 10/2019 | ............... H02J 3/38 |
| CN | 111064380 | A | * | 4/2020 | ......... H02M 7/5387 |
| CN | 111416393 | A | * | 7/2020 | ............... H02J 3/40 |
| CN | 108321845 | B | * | 4/2021 | ........... H02J 3/0014 |
| CN | 117543549 | A | * | 2/2024 | ......... H02J 3/00142 |
| CN | 117613946 | A | * | 2/2024 | ............... H02J 3/17 |
| CN | 118473008 | A | * | 8/2024 | ........... H02J 3/0014 |

OTHER PUBLICATIONS

Rehman et al., "An advanced virtual synchronous generator control technique for frequency regulation of grid-connected PV system", Apr. 2020, Electrical Power and Energy Systems 125. (Year: 2020).*

Xiao et al., "An inertial droop control based on comparisons between virtual synchronous generator and droop control in inverter-based distributed generators", Sep. 2020, 2020 7th International Conference on Power and Energy Systems Engineering (CPESE 2020). (Year: 2020).*

Meng et al., "Comparison between Virtual Synchronous Generator and Droop Controlled Inverter", 2016, IEEE. (Year: 2016).*

Lu et al., "Consensus-Based Secondary Frequency and Voltage Droop Control of Virtual Synchronous Generators for Isolated AC Micro-Grids", Sep. 2015, IEEE Journal on Emerging and Selected Topics in Circuits and Systems, vol. 5, No. 3. (Year: 2015).*

Meng et al., "A Generalized Droop Control for Grid-Supporting Inverter Based on Comparison Between Traditional Droop Control and Virtual Synchronous Generator Control", Jun. 2019, IEEE Transactions on Power Electronics, vol. 34, No. 6. (Year: 2019).*

Liu et al., "Comparison of Dynamic Characteristics Between Virtual Synchronous Generator and Droop Control in Inverter-Based Distributed Generators", May 2016, IEEE Transactions on Power Electronics, vol. 31, No. 5. (Year: 2016).*

* cited by examiner

PV = Photovoltaic

SC = Supercapacitor

IPC = Instantaneous Power Calculation

Active Power = Active Power Frequency Control Link

Reactive Power = Reactive Power Frequency Control Link

VIC = Virtual Impedance Control

Control Loop = Current Inner Control Loop

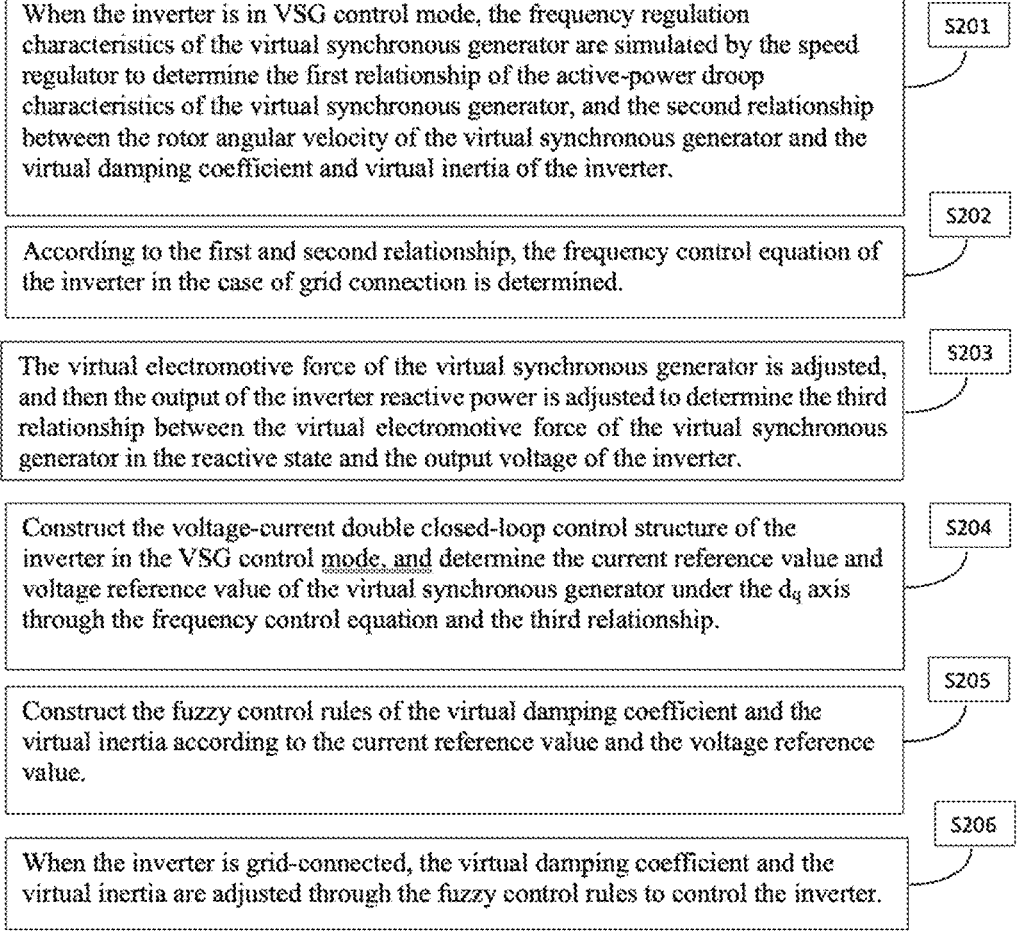

When the inverter is in VSG control mode, the frequency regulation characteristics of the virtual synchronous generator are simulated by the speed regulator to determine the first relationship of the active-power droop characteristics of the virtual synchronous generator, and the second relationship between the rotor angular velocity of the virtual synchronous generator and the virtual damping coefficient and virtual inertia of the inverter.

S201

According to the first and second relationship, the frequency control equation of the inverter in the case of grid connection is determined.

S202

The virtual electromotive force of the virtual synchronous generator is adjusted, and then the output of the inverter reactive power is adjusted to determine the third relationship between the virtual electromotive force of the virtual synchronous generator in the reactive state and the output voltage of the inverter.

S203

Construct the voltage-current double closed-loop control structure of the inverter in the VSG control mode, and determine the current reference value and voltage reference value of the virtual synchronous generator under the $d_q$ axis through the frequency control equation and the third relationship.

S204

Construct the fuzzy control rules of the virtual damping coefficient and the virtual inertia according to the current reference value and the voltage reference value.

S205

When the inverter is grid-connected, the virtual damping coefficient and the virtual inertia are adjusted through the fuzzy control rules to control the inverter.

ELECTRICALLY DRIVEN DISTILLATION SYSTEM WITH VARIABLE DYNAMIC LOAD AND A DISTILLATION METHOD

TECHNICAL FIELD

The present invention belongs to the field of power electronics, and in particular relates to an inverter control method, device, computer equipment and storage medium.

BACKGROUND ART

With the proposal of China's "dual carbon" goals, China's distributed energy installed capacity has grown rapidly. A large-scale distributed energy base development model has become the mainstream, providing strong support for the development of the new energy industry. Since desert areas such as the Gobi desert have rich solar and wind energy resources, the country is focusing on promoting construction of large-scale wind power and photovoltaic bases in desert areas of the Gobi desert.

In the prior art, photovoltaic power generation, as an important part of power grid transmission, is connected to the power grid through a grid-connected inverter. The grid-connected inverter has the advantage of fast response speed, but photovoltaic power generation has significant randomness and volatility in energy output, and the inverter lacks the rotational inertia and the ability to participate in frequency and voltage regulation of synchronous generators. This leads to reduced stability of the entire photovoltaic power generation system, and makes it difficult to adapt to the needs and changes of the power grid, resulting in a reduction in the grid's standby rotational inertia, and even affecting the overall stability of the power grid.

SUMMARY OF THE INVENTION

In order to solve the problem that the above inverter cannot maintain system stability in conjunction with photovoltaic grid connections, the present invention provides an inverter control method, device, computer equipment and storage medium.

In order to achieve the above object, the present invention provides the following technical solutions:

First, an inverter control method is provided, the method comprising:

When the inverter is in a virtual synchronous generator VSG control mode, the frequency regulation characteristics of the virtual synchronous generator are simulated by the speed regulator to determine a first relational expression of the active power-frequency droop characteristics of the virtual synchronous generator and a second relational expression of the rotor angular velocity of the virtual synchronous generator and the virtual damping coefficient and virtual inertia of the inverter;

A frequency control equation of the inverter in a grid-connected state according to the first relational expression and the second relational expression is determined;

The virtual electromotive force of the virtual synchronous generator is adjusted, thereby adjusting the output of the reactive power of the inverter, and determining a third relationship between the virtual electromotive force of the virtual synchronous generator in the reactive state and the output voltage of the inverter;

A voltage-current dual closed-loop control structure of the inverter in the VSG control mode is constructed, and the current reference value and the voltage reference value of the virtual synchronous generator under the $d_q$ axis through the frequency control equation and the third relationship is determined;

According to the current reference value and the voltage reference value, a fuzzy control rule of a virtual damping coefficient and a virtual inertia is constructed; when the inverter is connected to the grid, the virtual damping coefficient and the virtual inertia are adjusted by the fuzzy control rule to control the inverter.

Optionally, the first relational expression is as follows:

$$P_m = P_{ref} + k_p(\omega_0 - \omega);$$

Wherein, $P_m$ and $P_{ref}$ are the mechanical power and reference active power of the virtual synchronous generator, respectively, $k_p$ is the active power-frequency droop coefficient, $\omega$ and $\omega_0$ are the grid-side angular velocity and reference angular velocity of the virtual synchronous generator, respectively.

Optionally, the second relational expression is as follows:

$$J\frac{d\omega}{dt} = T_m - T_e - T_d = \frac{P_m}{\omega_0} - \frac{P_e}{\omega_0} - D(\omega - \omega_0);$$

Wherein, $J$ is the virtual inertia, $T_m$, $T_e$ and $T_d$ are the mechanical torque, electromagnetic torque and damping torque of the virtual synchronous generator respectively, $P_e$ is the electromagnetic power of the virtual synchronous generator, $D$ is the virtual damping coefficient, $d\omega/dt$ which is the time derivative of the grid-side angular velocity, that is, the rate of change of the grid-side angular velocity.

Optionally, the frequency control equation is as follows:

$$Js\Delta\omega = \frac{P_{ref} + k_p(\omega_0 - \omega) - P_e}{\omega_0} - D(\omega - \omega_0);$$

Where $s$ is the equivalent moment of inertia and $\Delta\omega$ is the angular frequency deviation.

Optionally, the third relationship is as follows:

$$K\frac{dE}{dt} = Q_{ref} - Q_e + K_q(U_n - U_0);$$

Wherein, $Q_{ref}$ is the reference reactive power, $Q_e$ is the actual output reactive power, $U_n$ is the effective value of the terminal voltage, $U_0$ is the rated voltage, $K_q$ is the voltage droop coefficient, $K$ is the reactive power regulation coefficient, and/is the no-load electromotive force.

Optionally, the current reference value and the voltage reference value of the virtual synchronous generator under the $d_q$ axis is determined by using the frequency control equation and the third relationship includes:

Output voltage amplitude and phase angle of the virtual synchronous generator are determined respectively by the frequency control equation and the third relational expression;

The output voltage amplitude and phase angle are converted to the $d_q$ axis, and feedback is calculated with the actual output voltage value under the inverter VSG control mode under the $d_q$ axis;

The result of feedback calculation is controlled by proportional integral to determine the $d_q$ axis reference current;

The reference current is feedback-calculated with the actual output current component of the inverter VSG control mode in the $d_q$ axis, and the result of the feedback calculation is controlled by proportional integral to determine the voltage reference value in the $d_q$ axis.

Optionally, the inverter is used to maintain the stability of the internal electromotive force of the energy storage system when the photovoltaic grid is connected; and the voltage reference value is used to characterize the internal electromotive force of the energy storage system.

Secondly, an inverter control device is also provided, the device comprising:

A determination module is used to simulate the frequency modulation characteristics of the virtual synchronous generator through the speed regulator when the inverter is in the VSG control mode, determine the first relationship between the active power-frequency droop characteristics of the virtual synchronous generator, and the second relationship between the rotor angular velocity of the virtual synchronous generator and the virtual damping coefficient and virtual inertia of the inverter; determine the frequency control equation of the inverter under the grid-connected condition according to the first relationship and the second relationship; the third relationship between the virtual electromotive force of the virtual synchronous generator in the reactive state and the output voltage of the inverter; construct a voltage-current dual closed-loop control structure of the inverter under the VSG control mode, and determine the current reference value and voltage reference value of the virtual synchronous generator under the $d_q$ axis through the frequency control equation and the third relationship;

A construction module, used for constructing fuzzy control rules of virtual damping coefficient and virtual inertia according to the voltage reference value;

A control module is used to control the virtual damping coefficient and the virtual inertia by using the fuzzy control rule when the inverter is connected to the grid.

In addition, a computer-readable storage medium is provided, wherein the storage medium stores a computer program, and when the computer program is executed by a processor, the steps of the inverter control method are implemented.

Finally, a computer device is also provided, comprising a memory, a processor, and a computer program stored in the memory and executable on the processor, wherein the processor implements the steps of the above inverter control method when executing the program.

The inverter control method provided by the present invention has the following beneficial effects:

When the inverter is in VSG control mode, the concepts of virtual damping coefficient and virtual inertia are introduced. By simulating the behavior of the virtual synchronous generator, the inverter can respond quickly to changes in the power grid and maintain stable operation. This control strategy improves the stability and performance of the inverter during the grid-connected process and reduces the harmonic disturbance of the power system. In addition, the virtual electromotive force of the virtual synchronous generator is adjusted, and then the output of the inverter reactive power is adjusted, so that the inverter can be flexibly adjusted according to the needs and changes of the power grid, which helps to improve the adaptability and reliability of the entire photovoltaic power generation system. Finally, through fuzzy control, the response speed of the inverter is accelerated, and the stability of the system is further improved.

BRIEF DESCRIPTION OF THE DRAWINGS

In order to more clearly illustrate the embodiment of the present invention and its design scheme, the following briefly introduces the drawings required for this embodiment. The drawings described below are only some embodiments of the present invention. For ordinary technicians in this field, other drawings can be obtained based on these drawings without creative work.

FIG. 2 is a schematic flow chart of an inverter control method provided according to an exemplary embodiment of the present invention.

DETAILED DESCRIPTION

In order to enable those skilled in the art to better understand the technical solution of the present invention and implement it, the present invention is described in detail below in conjunction with the accompanying drawings and specific embodiments. The following embodiments are only used to more clearly illustrate the technical solution of the present invention, and cannot be used to limit the scope of protection of the present invention.

Photovoltaic power generation is an important part of power grid transmission and is connected to the power grid through grid-connected inverters. The large-scale access of new energy power generation has led to a decrease in the inertial support capacity of the power grid, which is unable to provide voltage and frequency support. To solve this problem, the inverter is required to have the ability to build a grid. By simulating the external characteristics of synchronous generators, the grid-building inverter provides inertia and damping for the system. It has the ability to quickly adjust, and thus becomes an effective way to solve the power fluctuations of new energy.

By simulating the external characteristics of synchronous generators, the grid-forming inverter that provides inertia and damping for the system has the ability to quickly adjust, and thus becomes an effective method to solve the power fluctuations of new energy. The frequency and voltage deviation signals of the microgrid are introduced into the active-frequency control link and the reactive-voltage control link, so that the inverter has the ability to form a grid in the island operation mode. When the grid frequency or voltage fluctuates, the inverter can effectively provide active power and reactive power support for the grid.

Based on droop control, virtual synchronous generator control simulates the rotor mechanical equation and stator voltage equation of the synchronous generator to enable the inverter to have the external characteristics of a traditional synchronous generator, with virtual rotational inertia and damping, which can play a buffering role when the grid frequency and voltage fluctuate.

Figure 1:
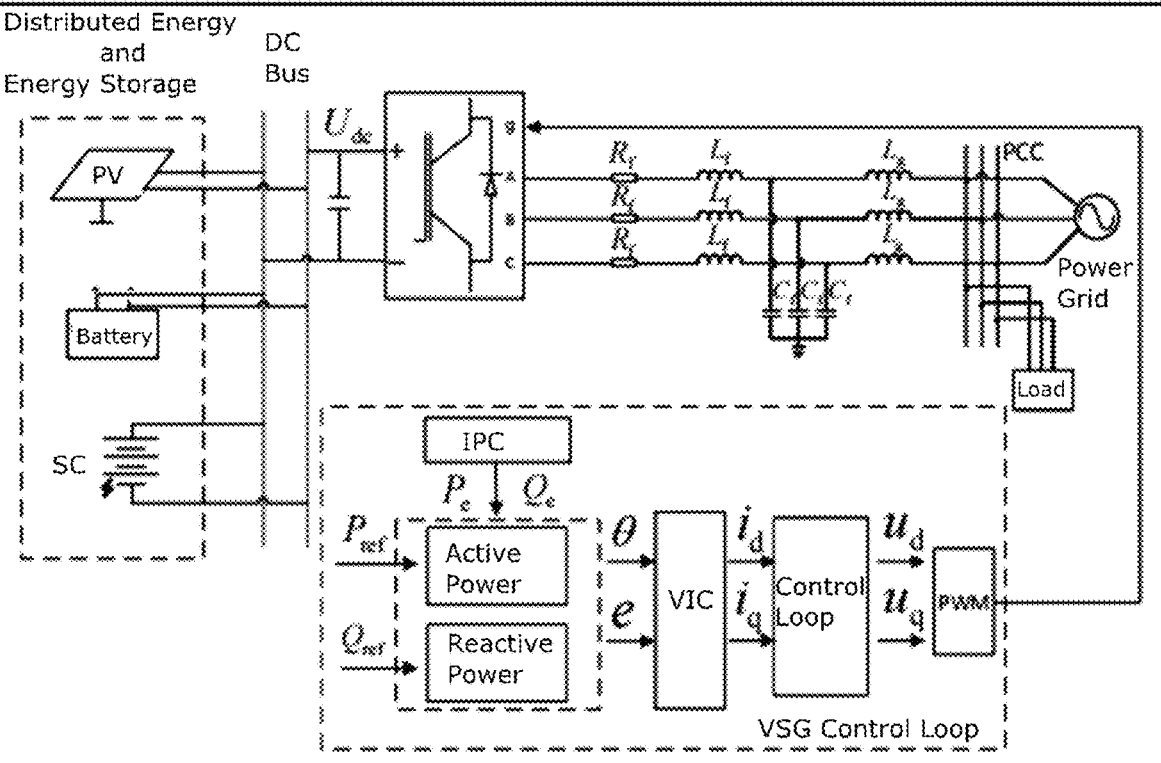
FIG. 1 is a topological diagram of a main circuit of a photovoltaic energy storage grid-connected system according to an exemplary embodiment of the present invention.

In order to further improve the dynamic performance of VSG control the present invention also proposes an adaptive control strategy based on fuzzy control. The main circuit topology is shown in FIG. 1. The energy storage part adopts a hybrid energy storage of batteries and supercapacitors. Wherein $L_g$ is the line impedance; $L_f$ and $R_f$ are the filter inductance and resistance; $C_f$ is the filter capacitor; $U_{dc}$ is the DC bus voltage; $P_{ref}$ and $Q_{ref}$ are the VSG active power reference value and reactive power reference value respectively. It has the characteristics of no need to consider complex mathematical functions and parameter settings, small calculation amount and excellent robustness.

The technical solutions provided by various embodiments of the present invention are described in detail below in conjunction with the accompanying drawings.

First, the present invention provides an inverter control method, as shown in FIG. 2, comprising the following steps:

S201. When the inverter is in VSG control mode, the frequency regulation characteristics of the virtual synchronous generator are simulated by the speed regulator to determine a first relationship between the active power-frequency droop characteristics of the virtual synchronous generator and a second relationship between the rotor angular velocity of the virtual synchronous generator and the virtual damping coefficient and virtual inertia of the inverter.

The grid-connected inverter has the characteristics of a voltage source. When the grid voltage fluctuates instantaneously, it can keep the internal potential E of the inverter stable, which will cause the grid-connected current I to change rapidly. The grid-connected control can achieve self-synchronization through the regulation of active power and can operate independently without relying on the support of the large grid.

The control strategies of the grid-type inverter include droop control, matching control, virtual oscillator control, and virtual synchronous generator (VSG) control. VSG control has the advantages of high stability, fast response speed, and strong adaptability. Therefore, this embodiment selects VSG control as the control strategy of the grid-type inverter.

In one embodiment, in the active power control link of the inverter, first, in the grid-connected mode, it is simulated as a frequency modulation characteristic of a virtual synchronous generator. The VSG active power control process uses a speed regulator and has an active power-frequency droop characteristic. The first relationship is specifically as follows:

$$P_m = P_{ref} + k_p(\omega_0 - \omega).$$

Wherein, $P_m$ and $P_{ref}$ are the mechanical power and reference active power of the virtual synchronous generator respectively, $k_p$ is the active power-frequency droop coefficient, $\omega$ and $\omega_0$ are the grid-side angular velocity and reference angular velocity of the virtual synchronous generator respectively.

Secondly, by adding virtual damping and virtual inertia, that is, by simulating the rotor motion equation of the generator, the rigid external characteristics of the inverter can be changed. The second relationship is as follows:

$$J\frac{d\omega}{dt} = T_m - T_e - T_d = \frac{P_m}{\omega_0} - \frac{P_e}{\omega_0} - D(\omega - \omega_0).$$

Wherein, J is the virtual inertia, $T_m$, $T_e$ and $T_d$ are the mechanical torque, electromagnetic torque and damping torque of the virtual synchronous generator respectively, $P_e$ is the electromagnetic power of the virtual synchronous generator, D is the virtual damping coefficient, $d\omega/dt$, which is the time derivative of the grid-side angular velocity, that is, the rate of change of the grid-side angular velocity.

S202: Determine a frequency control equation of the inverter in a grid-connected state according to the first relational expression and the second relational expression.

The frequency control equation is obtained by combining the first and second equations, as follows:

$$Js\Delta\omega = \frac{P_{ref} + k_p(\omega_0 - \omega) - P_e}{\omega_0} - D(\omega - \omega_0).$$

S203, adjusting the virtual electromotive force of the virtual synchronous generator, and then adjusting the output of the inverter reactive power, and determining a third relationship between the virtual electromotive force of the virtual synchronous generator in the reactive state and the output voltage of the inverter.

Excitation control can adjust the excitation electromotive force of the virtual synchronous generator, and then adjust the output of reactive power to ensure the stability of the terminal voltage. By adjusting the virtual electromotive force Em in VSG control to achieve the effect of simulating the synchronous generator to adjust reactive power and voltage, the third relationship is as follows:

$$K\frac{dE}{dt} = Q_{ref} - Q_e + K_q(U_n - U_0).$$

Among them, $Q_{ref}$ is the reference reactive power, $Q_e$ is the actual output reactive power, $U_n$ is the effective value of the terminal voltage, $U_0$ is the rated voltage, $K_q$ is the voltage droop coefficient, E is the no-load electromotive force, K is the reactive power adjustment coefficient, and the voltage amplitude of the reference electromotive force can be obtained through this control link Compared with droop control, VSG gradually approaches the steady-state operating point through continuous voltage regulation, avoiding system oscillation caused by frequent voltage regulation, and has better dynamic performance.

the $d_q$ axis through the frequency control equation and the third relationship.

Specifically, the output voltage amplitude and phase angle of the virtual synchronous generator are determined respectively by the frequency control equation and the third relationship; the output voltage amplitude and phase angle are converted to the $d_q$ axis, and feedback calculation is performed with the actual output voltage value under the inverter VSG control mode under the $d_q$ axis; the result of the feedback calculation is subjected to proportional-integral control to determine the $d_q$ axis reference current; the reference current is subjected to feedback calculation with the actual output current component under the inverter VSG control mode under the $d_q$ axis, and the voltage reference value under the $d_q$ axis is determined after the result of the feedback calculation is subjected to proportional-integral control.

Under the control of the voltage and current dual closed loop, the VSG system controls the inverter to behave as a stable voltage source, providing stable voltage support for the system. It can also provide stable voltage support for the system in island mode.

fuzzy control rules of a virtual damping coefficient and a virtual inertia according to the current reference value and the voltage reference value.

Specifically, the current reference value and the voltage reference value are determined as the input of the fuzzy control system, and fuzzification processing is performed. According to the membership value obtained by the membership function and the fuzzy control rule, a logical operation is performed to obtain the membership set of the output corresponding to the actual value of the control quantity. When the inverter is connected to the grid, the virtual damping coefficient and the virtual inertia are controlled by the fuzzy control rule.

When a load disturbance occurs in the grid-connected VSG system, the system frequency will oscillate at the moment of the disturbance. During the system disturbance, an oscillation cycle can be divided into four intervals, and the adaptive adjustment principle of J and D is determined according to the interval.

In disturbance interval 1, the system given power increases, and the angular frequency deviation $\Delta\omega$ begins to increase, reaching the maximum oscillation value at time $t_2$. In this process, the angular frequency deviation and the angular frequency change rate are both positive, so it is necessary to increase the moment of inertia to limit the increase of the angular frequency deviation, and appropriately increase the damping to prevent excessive overshoot.

In disturbance interval 2, $\Delta\omega$ begins to fall back to 0, $d\omega/dt$ is negative, and the angular frequency shows a recovery trend. Therefore, a smaller moment of inertia value should be selected, and the degree of damping increase should be appropriately reduced to accelerate the recovery of the angular frequency.

In disturbance intervals 3 and 4, the change ideas of the moment of inertia and damping are similar to those in disturbance intervals 1 and 2. In summary, the adjustment rules of the virtual moment of inertia and virtual damping in one oscillation cycle can be obtained.

According to the changes of the above oscillation period, the adjustment rules of J and D are transformed into fuzzy control rules, thereby realizing the real-time adjustment of J and D.

S206. When the inverter is connected to the grid, the virtual damping coefficient and the virtual inertia are adjusted by the fuzzy control rule to control the inverter.

Take $\Delta\omega$ and $d\omega/dt$ as fuzzy control inputs e and $e_c$, the $\Delta\omega$ input domain is $[-1,1]$, and the $d\omega/dt$ input domain is $[-20,20]$, and get the fuzzy reasoning module input to complete the fuzzification.

Set the $\Delta\omega$ input fuzzy set to {NB (indicates extremely negative), NS (indicates negative), ZO (indicates 0), PS (indicates positive), PB (indicates extremely positive)}; set the $d\omega/dt$ input fuzzy set to {NB (indicates extremely negative), NS (indicates negative), ZO (indicates 0), PS (indicates positive), PB (indicates extremely positive)}; set the output fuzzy sets to {NB (indicates extremely negative), NS (indicates negative), ZO (indicates 0), PS (indicates positive), PB (indicates extremely positive)}.

In addition, in the present invention, the inverter is used to maintain the stability of the internal electromotive force of the energy storage system when the photovoltaic grid is connected; and the voltage reference value is used to characterize the internal electromotive force of the energy storage system.

Specifically, the present invention also provides a power storage unit for a photovoltaic system, in which both a storage battery and a supercapacitor are connected to a DC bus using a bidirectional Boost/Buck power converter.

When the energy storage unit is charged, the converter works in Buck mode. In a switching cycle, when P2 is set to 1, the diode D1 is in a reverse bias state, and energy flows from the DC bus to the energy storage unit to complete the charging. At the same time, the inductor L is charged, and when P2 is set to 0, the diode D1 is in a forward bias state, and the inductor L is discharged.

When the energy storage unit is discharged, the converter works in Boost mode, and the diode D2 is forward biased. In a switching cycle, when P1 is set to 1, energy is transferred from the energy storage unit to the inductor L. When P1 is set to 0, the electric energy stored in the inductor and the energy storage unit is released to the DC bus through anti-parallel connection.

In order to improve the energy utilization efficiency of the system, the present invention also provides 7 working modes according to the output of the photovoltaic array and the energy storage system, as follows:

Mode 1: PV power generation is in surplus, the battery SOC is normal, and the battery is in power output state. Both the battery and the supercapacitor are switched to charging mode to complete the consumption.

Mode 2: PV power generation is in surplus, the battery SOC is normal, the battery is temporarily inactive, and the supercapacitor is switched to charging mode, with priority given to charging the supercapacitor.

Mode 3: PV power generation is in surplus and the battery SOC is abnormal. The supercapacitor is temporarily inactive and all surplus power is absorbed by the battery.

Mode 4: There is a shortage of photovoltaic power generation, the battery SOC is normal, the battery is in power output state, and the battery outputs active power to make up for the power shortage.

Mode 5: PV power generation is insufficient and the battery SOC status is abnormal. The battery will immediately exit and the supercapacitor will make up for the shortfall.

Mode 6: PV power generation is insufficient and the battery SOC is normal. The battery switches to discharge mode to make up for the shortfall.

Mode 7: PV power generation is insufficient and the battery SOC status is abnormal. The battery will exit immediately and the supercapacitor will make up for the shortfall.

By adopting the above method, the concepts of virtual damping coefficient and virtual inertia are introduced when the inverter is in VSG control mode. By simulating the behavior of the virtual synchronous generator, the inverter can respond quickly to changes in the power grid and maintain stable operation. This control strategy improves the stability and performance of the inverter during the grid-connected process and reduces the harmonic disturbance of the power system. In addition, by changing the output active power and reactive power of the virtual synchronous generator and other parameters, the inverter can be flexibly adjusted according to the needs and changes of the power grid, which helps to improve the adaptability and reliability of the entire photovoltaic power generation system. Finally, through fuzzy control, the response speed of the inverter is accelerated, and the stability of the system is further improved.

Figure 3:
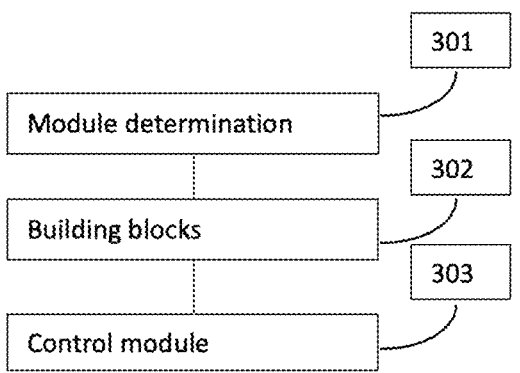
FIG. 3 is a block diagram of an inverter control device provided according to an exemplary embodiment of the present invention.

Secondly, the present invention also provides an inverter control device, as shown in FIG. 3, comprising:

Determination module 301, used for simulating the frequency modulation characteristics of the virtual synchronous generator by the speed regulator when the inverter is in the VSG control mode, determining the first relationship of the active power-frequency droop characteristics of the virtual synchronous generator, and the second relationship of the rotor angular velocity of the virtual synchronous generator and the virtual damping coefficient and virtual inertia of the inverter;

determining the frequency control equation of the inverter in the grid-connected state according to the first relationship and the second relationship; the third relationship of the virtual electromotive force of the virtual synchronous generator in the reactive state and the output voltage of the inverter; constructing the voltage-current dual closed-loop control structure of the inverter in the VSG control mode, and determining the current reference value and voltage reference value of the virtual synchronous generator under the dq axis through the frequency control equation and the third relationship;

A construction module 302 is used to construct a fuzzy control rule of a virtual damping coefficient and a virtual inertia according to the voltage reference value;

The control module 303 is used to control the virtual damping coefficient and the virtual inertia by using the fuzzy control rule when the inverter is connected to the grid.

By adopting the above device, the concepts of virtual damping coefficient and virtual inertia are introduced when the inverter is in VSG control mode. By simulating the behavior of the virtual synchronous generator, the inverter can quickly respond to changes in the power grid and maintain stable operation. This control strategy improves the stability and performance of the inverter during the grid connection process and reduces the harmonic disturbance of the power system. In addition, by changing the output active power and reactive power and other parameters of the virtual synchronous generator, the inverter can be flexibly adjusted according to the needs and changes of the power grid, which helps to improve the adaptability and reliability of the entire photovoltaic power generation system. Finally, through fuzzy control, the response speed of the inverter is accelerated, and the stability of the system is further improved.

The present invention also provides a computer-readable storage medium, which stores a computer program. The computer program can be used to execute the steps of the rice field weed identification method provided in FIG. 1 above.

The present invention also provides a computer device, which includes a processor, an internal bus, a network interface, a memory, and a non-volatile memory at the hardware level, and may also include hardware required for other services. The processor reads the corresponding computer program from the non-volatile memory into the memory and then runs it to implement the steps of the rice field weed identification method provided in FIG. 1 above.

It will be appreciated by those skilled in the art that embodiments of the present invention may be provided as methods, systems or computer program products. Therefore, the present invention may take the form of a complete hardware embodiment, a complete software embodiment or an embodiment combining software and hardware. Moreover, the present invention may take the form of a computer program product implemented on one or more computer-usable storage media (including but not limited to disk storage, CD-ROM, optical storage, etc.) containing computer-usable program code.

The present invention is described with reference to the flowcharts and/or block diagrams of the methods, devices (systems) and computer program products according to the embodiments of the present invention. It should be understood that each process and/or box in the flowchart and/or block diagram, as well as the combination of the processes and/or boxes in the flowchart and/or block diagram, can be implemented by computer program instructions. These computer program instructions can be provided to a processor of a general-purpose computer, a special-purpose computer, an embedded processor or other programmable data processing device to generate a machine, so that the instructions executed by the processor of the computer or other programmable data processing device generate a device for implementing the functions specified in one or more processes in the flowchart and/or one or more boxes in the block diagram.

These computer program instructions may also be stored in a computer-readable memory that can direct a computer or other programmable data processing device to work in a specific manner, so that the instructions stored in the computer-readable memory produce a manufactured product including an instruction device that implements the functions specified in one or more processes in the flowchart and/or one or more boxes in the block diagram.

These computer program instructions may also be loaded onto a computer or other programmable data processing device so that a series of operational steps are executed on the computer or other programmable device to produce a computer-implemented process, whereby the instructions executed on the computer or other programmable device provide steps for implementing the functions specified in one or more processes in the flowchart and/or one or more boxes in the block diagram.

It should be noted that the above specific implementation method can enable those skilled in the art to understand the invention more comprehensively, but does not limit the invention in any way. Therefore, although the present invention has been described in detail in this specification, those skilled in the art should understand that the invention can still be modified or replaced by equivalents; and all technical solutions and improvements that do not deviate from the spirit and scope of the invention are included in the protection scope of the patent for the invention. Any figure mark in the claims should not be regarded as limiting the claims involved.

The invention claimed is:

1. An inverter control method, characterized in that the method comprises:

when the inverter is in a virtual synchronous generator (VSG) control mode, simulate frequency regulation characteristics of a VSG by a speed regulator to determine a first relational expression of active power-frequency droop characteristics of the VSG and a second relational expression of rotor angular velocity of the VSG and a virtual damping coefficient and virtual inertia of the inverter;

determine a frequency control relationship of the inverter in a grid-connected state according to the first relational expression and the second relational expression;

adjust a virtual electromotive force of the VSG, thereby adjusting output of reactive power of the inverter, and determine a third relational expression between the virtual electromotive force of the VSG in the reactive state and output voltage of the inverter;

construct a voltage-current dual closed-loop control structure of the inverter in the VSG control mode, and determine a current reference value and a voltage reference value of the virtual synchronous generator under a $d_q$ axis by the frequency control equation and the third relational expression;

wherein determining the current reference value and the voltage reference value of the virtual synchronous generator under the $d_q$ axis by the frequency control equation and the third relational expression comprises:

determining the output voltage amplitude and phase angle of the virtual synchronous generator by the frequency control equation and the third relational expression;

wherein, the output voltage amplitude and phase angle are converted to the $d_q$ axis, and feedback is calculated with the actual output voltage value under the inverter VSG control mode under the $d_q$ axis;

the result of feedback calculation is controlled by proportional integral to determine the $d_q$ axis reference current;

the reference current is feedback-calculated with the actual output current component of the inverter VSG control mode in the $d_q$ axis, and the result of the feedback calculation is controlled by proportional integral to determine the voltage reference value in the $d_q$ axis:

according to the current reference value and the voltage reference value, construct a fuzzy control rule of a virtual damping coefficient and a virtual inertia, wherein, when the inverter is connected to the grid, the virtual damping coefficient and the virtual inertia are adjusted by the fuzzy control rule to control the inverter.

2. The inverter control method according to claim 1, characterized in that the first relational expression is as follows:

$$P_m = P_{ref} + k_p(w_0 - w);$$

Wherein, $P_m$ and $P_{ref}$ are the mechanical power and reference active power of the virtual synchronous generator, $k_p$ is the active power-frequency droop coefficient, w and $w_0$ are the grid-side angular velocity and reference angular velocity of the virtual synchronous generator.

3. The inverter control method according to claim 2, characterized in that the second relational expression is as follows:

$$J\frac{d\omega}{dt} = T_m - T_e - T_d = \frac{P_m}{\omega_0} - \frac{P_e}{\omega_0} - D(\omega - \omega_0);$$

Wherein, J is the virtual inertia, $T_m$, $T_e$ and $T_d$ are the mechanical torque, electromagnetic torque and damping torque of the virtual synchronous generator respectively, $P_e$ is the electromagnetic power of the virtual synchronous generator, D is the virtual damping coefficient, $d\omega/dt$ is the time derivative of the grid-side angular velocity, that is, the rate of change of the grid-side angular velocity.

4. The inverter control method according to claim 3, characterized in that the frequency control equation is as follows:

$$Js\Delta\omega = \frac{P_{ref} + k_p(\omega_0 - \omega) - P_e}{\omega_0} - D(\omega - \omega_0);$$

Where, s is the equivalent moment of inertia and $\Delta\omega$ is the angular frequency deviation.

5. The inverter control method according to claim 1, characterized in that the third relational expression is as follows:

$$K\frac{dE}{dt} = Q_{ref} - Q_e + K_q(U_n - U_0);$$

Wherein, $Q_{ref}$ is the reference reactive power, $Q_e$ is the actual output reactive power, $U_n$ is the effective value of the terminal voltage, $U_0$ is the rated voltage, $K_q$ is the voltage droop coefficient, K is the reactive power regulation coefficient, and E is the no-load electromotive force.

6. The inverter control method according to claim 1, characterized in that the inverter is used to maintain the stability of the internal electromotive force of the energy storage system when the photovoltaic grid is connected; and the voltage reference value is used to characterize the internal electromotive force of the energy storage system.

7. A computer-readable storage medium, characterized in that the storage medium stores a computer program, and when the computer program is executed by a processor, the steps of the inverter control method according to claim 1 is implemented.

8. A computer device, comprising a memory, a processor and a computer program stored in the memory and executable on the processor, wherein the processor implements the steps of the inverter control method according to claim 1 when executing the program.

9. An inverter control device, characterized in that the device comprises:

a determination module capable of simulating frequency modulation characteristics of a virtual synchronous generator (VSG) through the speed regulator when the inverter is in VSG control mode, determining a first relationship between active power-frequency droop characteristics of the VSG, and a second relationship between rotor angular velocity of the VSG and a virtual damping coefficient and virtual inertia of the inverter;

determining a frequency control equation of the inverter under a grid-connected condition according to the first relationship and the second relationship; determining a third relationship between the virtual electromotive force of the virtual synchronous generator in the reactive state and the output voltage of the inverter;

constructing a voltage-current dual closed-loop control structure of the inverter under the VSG control mode, and determining a current reference value and voltage reference value of the VSG under a $d_q$ axis through the frequency control equation and the third relationship;

wherein determining the current reference value and the voltage reference value of the virtual synchronous generator under the $d_q$ axis by the frequency control equation and the third relational expression comprises:

determining the output voltage amplitude and phase angle of the virtual synchronous generator by the frequency control equation and the third relational expression;

wherein, the output voltage amplitude and phase angle are converted to the $d_q$ axis, and feedback is calculated with the actual output voltage value under the inverter VSG control mode under the $d_q$ axis;

the result of feedback calculation is controlled by proportional integral to determine the $d_q$ axis reference current;

the reference current is feedback-calculated with the actual output current component of the inverter VSG control mode in the $d_q$ axis, and the result of the feedback calculation is controlled by proportional integral to determine the voltage reference value in the $d_q$ axis:

a construction module, used for constructing fuzzy control rules of virtual damping coefficient and virtual inertia according to the voltage reference value; and a control module is capable of controlling the virtual damping coefficient and the virtual inertia by using the fuzzy control rule when the inverter is connected to the grid.

* * * * *